United States Patent
Krutin

(10) Patent No.: US 10,021,903 B2
(45) Date of Patent: Jul. 17, 2018

(54) APPARATUS AND METHOD FOR PROCESSING LOOSE PRODUCTS

(71) Applicant: TYPHOON INNOVATION LLC, Vyazniki (RU)

(72) Inventor: Alexander Nikolaevich Krutin, Stavropol (RU)

(73) Assignee: TYPHOON INNOVATION LLC, Vyazniki (RU)

( * ) Notice: Subject to any disclaimer, the term of this patent is extended or adjusted under 35 U.S.C. 154(b) by 375 days.

(21) Appl. No.: 14/718,385

(22) Filed: May 21, 2015

(65) Prior Publication Data
US 2016/0219924 A1 Aug. 4, 2016

(30) Foreign Application Priority Data

Jan. 29, 2015 (RU) ................................ 2015102975

(51) Int. Cl.
*A23N 12/10* (2006.01)
*A23F 5/04* (2006.01)
(Continued)

(52) U.S. Cl.
CPC .............. *A23N 12/10* (2013.01); *A23F 5/046* (2013.01); *A23N 12/083* (2013.01);
(Continued)

(58) Field of Classification Search
CPC ...... F26B 23/02; F26B 15/10; F26B 2200/06; F26B 3/082; F26B 3/08; A23N 12/10; A23N 12/125; A23N 12/083; A23F 5/046
(Continued)

(56) References Cited

U.S. PATENT DOCUMENTS 2,859,116 A   11/1958   Heimbs et al.
2,876,557 A   3/1959   Ducatteau
(Continued)

FOREIGN PATENT DOCUMENTS

RU   2508514   *   2/2014
RU   2532060         8/2014

OTHER PUBLICATIONS

United Coffee & Tea Industry Event 2014 at http://typhoon-in.com/ru/novosti/united-ooffee-i-tea-2014.html accessed Oct. 7, 2015.
(Continued)

*Primary Examiner* — Steven B McAllister
*Assistant Examiner* — Ko-Wei Lin
(74) *Attorney, Agent, or Firm* — Oblon, McClelland, Maier & Neustadt, L.L.P.

(57) ABSTRACT

An apparatus for roasting and cooling loose products includes an oven with a housing including an upper and a lower section with glass doors. The apparatus has an air and a gas distribution grid connected to the upper and lower sections. In addition, the apparatus includes a high-pressure ventilator in the upper section having an outlet connected to the air duct, a rotor drum installed over the gas distribution grid, a feeding tray located in the upper section, a heater located in the lower section and configured to heat air and a hopper located on top of the housing above the rotor drum and configured to feed the loose products into the oven. The hopper includes one or more strain gauges configured to weigh the loose products. An opening located adjacent the hopper intakes fresh air intake and outtakes humidified air and a horizontal cooler chills the loose products.

23 Claims, 4 Drawing Sheets

(51) Int. Cl.
*A23N 12/12* (2006.01)
*A23N 12/08* (2006.01)
*F26B 3/08* (2006.01)

(52) U.S. Cl.
CPC .............. *A23N 12/125* (2013.01); *F26B 3/08* (2013.01); *F26B 2200/06* (2013.01)

(58) Field of Classification Search
USPC ................ 432/58; 34/210–212; 99/474, 476; 426/467
See application file for complete search history.

(56) References Cited

U.S. PATENT DOCUMENTS

| | | | |
|---|---|---|---|
| 3,060,590 A | 10/1962 | Brown | |
| 3,149,976 A | 9/1964 | Smith | |
| 3,189,460 A | 6/1965 | Smith | |
| 3,263,339 A | 8/1966 | Brown et al. | |
| 3,328,894 A | 7/1967 | Smith | |
| 3,329,506 A | 7/1967 | Smith | |
| 3,345,181 A | 10/1967 | Smith | |
| 3,370,522 A | 2/1968 | Anderson et al. | |
| 3,385,199 A | 5/1968 | Smith | |
| 3,447,338 A | 6/1969 | Smith | |
| 3,486,240 A | 12/1969 | Nowak et al. | |
| 3,584,850 A * | 6/1971 | Brandvold | C22B 1/2406 106/753 |
| 3,615,668 A | 10/1971 | Smith | |
| 3,724,090 A | 4/1973 | Smith | |
| 3,809,775 A | 5/1974 | Ganiaris et al. | |
| 3,964,175 A | 6/1976 | Sivetz | |
| 7,195,010 B2 * | 3/2007 | Kuroda | F23N 5/102 126/110 E |
| 2011/0269085 A1 * | 11/2011 | Wiker | A21B 1/40 432/4 |

OTHER PUBLICATIONS

Prodexpo 2015 at: http://typhoon-in.com/ru/novosti/vyistavka-prodekspo-2015.html accessed Oct. 7, 2015.
Exhibition Prodexpo 2014 at http://typhoon-in.com/ru/novosti/vyistavka-agromash-2014.html accessed Oct. 7, 2015.
Exhibition in Brazil Fortaleza 2014 at http://typhoon-in.com/ru/novosti/vyistavka-v-brazilii.html accessed Oct. 7, 2015.
Exhibition "Food Industry" in Azerbaijan at http://typhoon-in.com/ru/novosti/vyistavka-pishhevaya-promyishlennost-v-azerbajdzhane.html accessed Oct. 7, 2015.

* cited by examiner

APPARATUS AND METHOD FOR PROCESSING LOOSE PRODUCTS

CROSS-REFERENCE TO RELATED APPLICATIONS

This application claims priority of Russian Patent Application No. RU2015102975, filed on Jan. 29, 2015, the contents of which are hereby incorporated herein by reference in their entirety.

BACKGROUND

Field of the Disclosure

The present invention relates to processing loose products such as coffee beans and to processing equipment.

Description of the Related Art

Commercial equipment for processing loose products such as coffee beans has not undergone any significant recent improvements in efficiency, adjustability or precision. The principles employed in widely utilized coffee roasters are virtually the same as those used over several decades ago.

The main improvement of recent ovens corresponds to the implementation of roasting through "fluid bed" techniques. Contrary to older drum ovens, where loose products are mixed mechanically and roasting occurs in a mesh drum with a horizontal rotation axis, and the drum has metal blades that stir the loose products as the drum rotates, more recent ovens stir and roast loose products through the action of hot air that generates a fluid bed under the loose products. Oven apparatuses with such features have long been known and widely used. In such a system, a fluid bed is generated through an area relatively small to the total volume of the loose products being roasted.

Such systems have a number of drawbacks, namely, a certain amount of the loose products would always concentrate near the fluid bed and be intensively stirred, while another part would go away from the fluid bed, and end up accumulated in an inactive layer. As a result, poor mixing of loose products in the ovens of this type does not ensure the maximum uniformity of roasting.

Furthermore, common roasting apparatuses lack adjustability, for example the ability to define a unique profile of roasting, which allows not only to track natural endothermic and exothermic processes in the roasting apparatus, but to also make adjustments to them, whereby the temperature in the chamber is raised or lowered depending on the selected profile. This adjustability is not available in common transmission-type roasting apparatuses. In such type of roasting apparatuses, only the time spent by loose products in the oven and the temperature of the burner could be adjusted. In addition, in commonly available roasting apparatuses loose products are continuously fed into the oven with a fixed temperature making it impossible to successively and precisely process different batches of loose products that may require different conditions for roasting.

In addition, commonly available roasting apparatuses lack of clear ways to visually inspect the process during roasting operation, as well as ways to easily and quickly access the main elements of the oven during maintenance.

Finally, a cooling stage that follows the roasting stage of the loose products also needs improvement. Standard cooling processes used in loose product apparatuses employ vertical coolers where the roasted loose products are cooled by being drop into a vertical intense flow of cold air. Such vertical coolers consume a lot of energy and require a long time for the loose products to be cooled.

SUMMARY

Accordingly, one object of the present invention is to provide an apparatus for roasting and cooling loose products which overcomes the above-mentioned limitations of conventional roasters. The apparatus ensures good mixing of loose products by air due to fluid beds that are evenly spread over the entire grid area under a rotor drum, where the roasting process occurs. In other words, an extremely well spread fluid bed is generated in the loose products which enables to achieve maximum uniformity of the roasting process.

A further object of the present invention is to provide a higher level of adjustability in the roasting process with the ability to process loose products through a cyclical pattern that feeds the oven with successive product batches of controllable weight and at controllable instances of time, as well as the ability for each of the batches to implement and control different roasting conditions, e.g. temperature profile for each of the batches.

A way to visually inspect the process during operation as well as to easily and quickly access main elements of the oven during maintenance through glass doors are also included.

Finally, an innovative horizontal cooler that cools the roasted loose products in an efficient and economical way is provided.

In one non-limiting illustrative example of the present invention, the apparatus for roasting and cooling loose products includes an oven with a housing including an upper section and a lower section. Each of the upper and lower sections has a glass door. The oven has an air duct on a first side of the housing and a gas distribution grid on a second side of the housing both connected to the upper and lower sections. In addition, the oven includes a high-pressure ventilator on the first side of the upper section having an outlet connected to the air duct, a rotor drum installed over the gas distribution grid in the upper section on the second side, a feeding tray located in the upper section, a heater located in the lower section and configured to heat air and a hopper located on top of the housing above the rotor drum and configured to feed the loose products into the oven.

The hopper includes one or more strain gauges configured to weigh the loose products being fed into the oven. An opening located adjacent the hopper in the upper section of the housing intakes fresh air and outtakes humidified air. A horizontal cooler chills the loose products.

In another non-limiting illustrative example of the claimed invention, a method for roasting and cooling loose products in the apparatus is presented. The method includes storing a preset weight of the loose products in the hopper and simultaneously preheating the oven by activating the burner until the air inside the oven reaches a preset initial roasting temperature detected by a sensor inside the oven.

The next steps of the method are feeding the oven with a batch of the loose products at a predetermined weight measured by the one or more strain gauges of the hopper, blowing air from the upper section mixed with hot air from the heater to the lower section through the air duct by activating the high-pressure ventilator and generating the fluid bed by letting air leave the lower section through the gas distribution grid on which the loose products sit.

The roasting is then done by increasing or decreasing the temperature inside the oven in order to follow a preset profile of temperature until a preset roasting time is reached. During this roasting step, the excessive air and humidified air is evacuated through the top opening. The roasting is stopped by turning off the high-pressure ventilator and discharging the loose products onto the cooling tray of the horizontal cooler.

The loose products are then cooled by activating the rotor fan until the loose products reach a preset temperature and are finally extracted by opening a trap at the bottom of the cooling tray.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of an object of the present disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
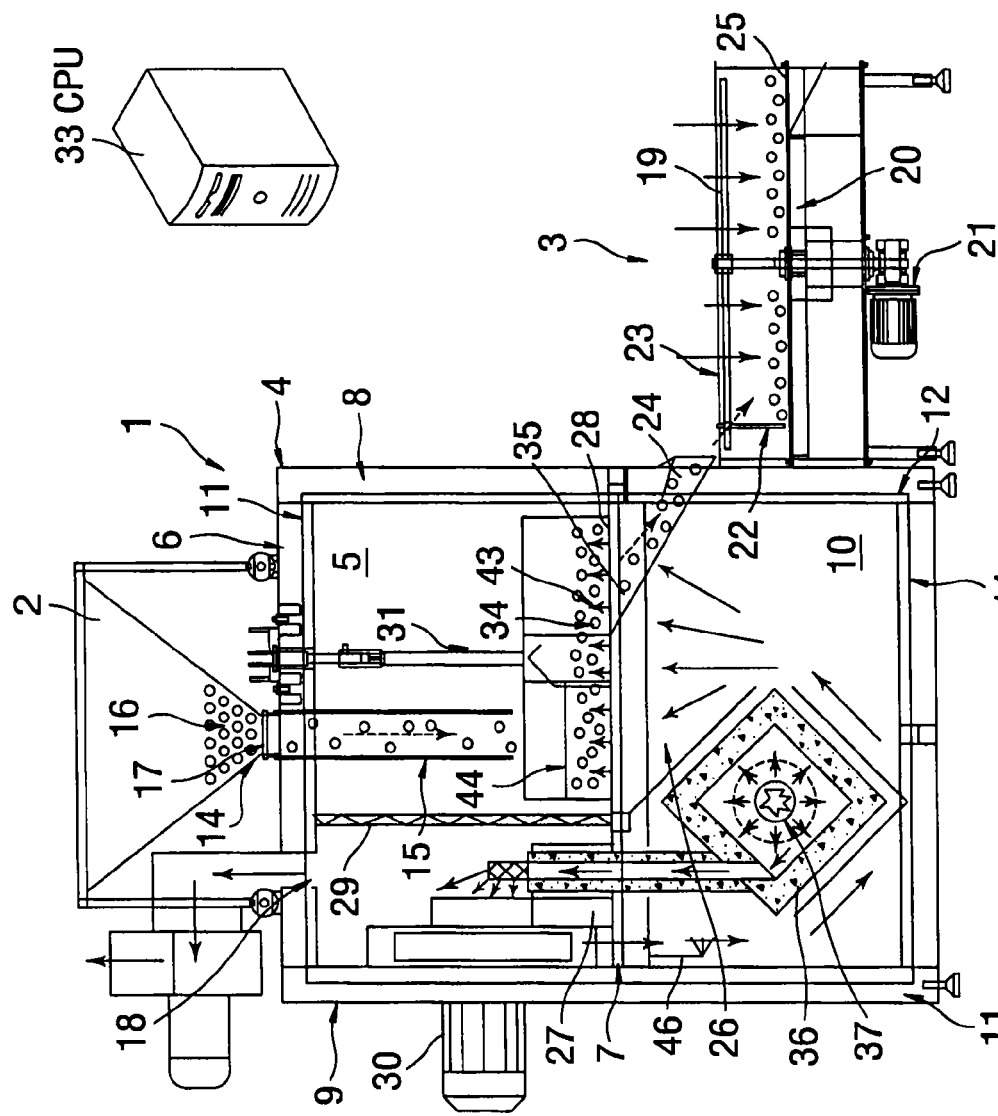
FIG. 1 is a cross sectional view of an embodiment of a roasting and cooling apparatus for loose products including an oven, a hopper and a horizontal cooler, according to certain aspects of the disclosure.

All publications, patent applications, patents, and other references mentioned herein are incorporated by reference in their entirety. In case of conflict, the present specification, including definitions, will control. Further, the materials, methods, and examples are illustrative only and are not intended to be limiting, unless otherwise specified.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

One object of the present invention is to provide an apparatus for roasting and cooling loose products comprises an oven with a housing including an upper section and a lower section, each of the upper and lower sections having a glass door; an air duct connected to the upper section and a lower section on a first side of the housing; a gas distribution grid connected to the upper section and the lower section on a second side of the housing; a high-pressure ventilator located on the first side of the upper section having an outlet connected to the air duct; a rotor drum installed over the gas distribution grid in the upper section on the second side of the housing; a feeding tray located in the upper section of the housing; a heater located in the lower section of the housing and configured to heat air; a hopper located on top of the housing above the rotor drum and configured to feed the loose products into the oven, wherein the hopper includes one or more strain gauges configured to weigh the loose products being fed into the oven; an opening located adjacent the hopper in the upper section of the housing for fresh air intake and humidified air outtake; and a horizontal cooler to cool the loose products.

In another embodiment, the gas distribution grid is round shaped. In yet another embodiment, the gas distribution grid comprises a drying area and a discharging area.

In another embodiment, the feeding tray is located above the drying area. Also, in another embodiment, the discharging area is radial cutout equal to one section of the rotor drum and is connected to a discharge hatch.

In yet another embodiment, the rotor drum comprises a plurality of blades. In an additional embodiment, an area between two blades is equal to the discharge area. In yet another embodiment, an oven further comprises a discharge slide below the discharge hatch.

In one embodiment, the drying area comprises a plurality of rows of holes. In another embodiment, the holes are between 2 mm and 8 mm in diameter. In an additional embodiment, the holes are spaced between 2 mm and 20 mm apart from each other's center. In a different embodiment, a distance between the rows is between 5 mm and 25 mm. In yet different embodiment, the first and second sides of the housing are divided in the upper section by a screen.

In a different embodiment, an oven comprises a controller including a microprocessor, wherein a process of roasting the loose products is executed under a predetermined program or manually.

A further object of the present invention is to provide a method for roasting and cooling loose products is conducted in an apparatus, wherein the apparatus includes an oven with a housing having an upper section and a lower section, an air duct connected to the upper section and the lower section, a gas distribution grid connected to the upper section and the lower section, a high-pressure ventilator a burner, a rotor drum installed over the air distribution, a hopper located on top of the housing with one or more strain gauges, an opening located in the upper section of the housing and a horizontal cooler having a rotor fan mounted horizontally above a horizontal cooling tray. The method comprises storing a preset weight of the loose products in the hopper; preheating the oven by activating the burner until the air inside the oven reaches a preset initial roasting temperature detected by a sensor inside the oven; feeding the oven with a batch of the loose products at a predetermined weight measured by the one or more strain gauges of the hopper; blowing air from the upper section mixed with hot air from the heater to the lower section through the air duct by activating the high-pressure ventilator; generating a fluid bed by letting air leave the lower section through the gas distribution grid on which the loose products sit; roasting the loose products by increasing or decreasing the temperature inside the oven in order to follow a preset profile of temperature until a preset roasting time is reached; evacuating excessive air and humidified air through the top opening; stopping the roasting by turning off the high-pressure ventilator; discharging the loose products onto the cooling tray of the horizontal cooler; cooling the loose products by activating the rotor fan until the loose products reach a preset temperature; extracting the loose products by opening a trap at the bottom of the cooling tray.

In one embodiment, the cooling of the loose products further comprises mixing the loose products through at least one mixing blade affixed radially and perpendicularly to the rotor fan of the horizontal cooler. In another embodiment, the method is executed manually or automatically under a predetermined program via a controller including a microprocessor. In a different embodiment, the gas distribution grid is round shaped and comprises a drying area and a discharging area. In yet another embodiment, the discharging area is a radial cutout equal to one section of the rotor drum and is connected to a discharge hatch and the drying area comprises a plurality of holes wherein the holes are between 2 mm and 8 mm in diameter and a distance between rows of holes is between 5 mm and 25 mm. The method may further comprise accessing a whole inside of the oven through a glass door covering entirely one side of the upper section and another glass door covering entirely one side of the lower section.

FIG. 1 is a cross sectional view of an embodiment of a roasting and cooling apparatus for loose products 16 comprising mainly of an oven 1 connected to a hopper 2 and a horizontal cooler 3. The oven 1 is characterized by a rectangular housing 4 made of an upper section 5 and lower section 10. The upper section 5 includes a top wall 6 opposite to a middle wall 7 and a right upper wall 8 opposite to a left upper wall 9. The lower section 10 includes the middle wall 7 opposite to a bottom wall 11 and a lower right wall 12 opposite to a lower left wall 13.

The hopper 2 is located outside the oven 1 and on top of the top wall 6 and is characterized by a chute 14 connected to an internal sleeve 15 through which the loose products 16 are sent into the inside of the oven 1. The open and closing of the chute 14 is controlled by a gate that incorporates strain gauges 17 in order to measure and weigh the batch of loose products 16 sent to the oven 1. In addition, next to the hopper 2 a top opening 18 on the top wall 6 of the oven 1 is used as a humidified air outtake and fresh air intake.

The horizontal cooler 3 is placed outside the oven 1 adjacent to the bottom part of the lower right wall 12 of the oven 1 and includes a cooling tray 20 in order to receive roasted loose products 24 coming from the oven 1. A cooling fan 19 is localized horizontally on top of the cooling tray 20 and actuated by an electrical motor 21. The cooling fan 19 is characterized by a plurality of mixing blades 22 placed radially and perpendicularly to the rotor 23. These mixing blades 22 start from the rotor 23 of the cooling fan 19 and extend vertically downwards towards the cooling tray 20. The length of these mixing blades 22 is such that they are in contact with the roasted loose products 24 but they do not touch the cooling tray 20. Under the cooling tray 20 a trap 25 is provided in order to extract and further process the cooled loose products.

In addition to the walls, the rectangular housing 4 of the oven 1 includes two glass doors 26 that close hermetically the upper section 5 and the lower section 10 of the oven 1 during operation and enable easy and fast access to the oven 1, during maintenance. Such a feature is particularly relevant during maintenance in order to remove efficiently various impurities that accumulate by the end of each shift and can cause fire. Specifically, in order to open the oven 1 and switch it into service mode, no more than twenty seconds are needed to access to the inside of the oven 1 without going through the most contaminated areas.

Inside the oven 1, gas circulation between the different sections is enabled and protected through different connecting devices such as screens or ducts. More precisely, the upper section 5 and the lower section 10 are interconnected with an air duct 27 on the left side of the oven 1, and with a gas distribution grid 28 on the right side of the oven 1. In the upper section 5 of the oven 1, a screen 29 is placed between the left and the right sides in order to prevent foreign impurities from getting into other parts of the oven 1.

A high-pressure ventilator 30 is located on the left side of the upper section 5 of the oven 1, with its outtake connected to the air duct 27 and its intake connected to an outside of the oven 1.

The roasting of the loose products happens in a rotor drum 31 installed horizontally in the right part of the upper section 5 and seated on the middle wall 7. This rotor drum 31 is actuated by a motor 32 sitting on the outside part of the top wall 6 of the rectangular housing 4 of the oven 1.

The rotor drum 31 has two, three or four blades and includes a feeding tray 44 in which the loose products 16 arrive from the chute 14 located above. A slide 35 is located below the rotor drum 31 enables the roasted loose products 24 to leave the oven 1 and be directed to the horizontal cooler 3 through the slide 35.

The bed of the rotor drum 31 includes a gas distribution grid 28 generating a fluid bed 34 of hot air on which the loose products 16 lie and roast. The fluid bed 34 is generated by a flow of hot air passing through the gas distribution grid 28 and heated by a heater 36 with a burner 37 located in the lower section 10 of the oven 1.

The flow of hot air being blown into the lower section 10 of the oven 1 is divided into hundreds of individual flows that are evenly distributed over the entire area under the rotor drum 31, where the loose products 16 are roasted and mixed intensely.

These multiple flows of hot air make the roasting process faster and more efficient, notably compared to conventional ovens for which the drum needs to be pre-heated before starting the roasting process.

Figure 2:
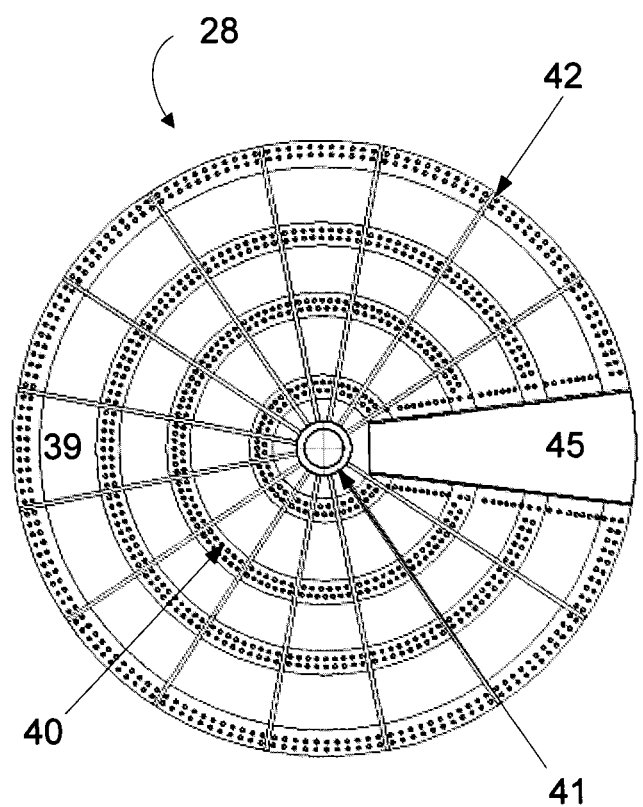
FIG. 2 is a top view of an embodiment of a gas distribution grid for roasting loose products, according to certain aspects of the disclosure.

FIG. 2 is top view of an embodiment of the gas distribution grid 28. In this embodiment, the gas distribution grid 28 is round shaped with an inner edge 41 and an outer edge 42 and has two radial areas, a drying area 39 and a discharging area 45. The discharging area 45 is a radial opening in the gas distribution grid 28 equal to one section of the rotor drum 31 and is connected to a discharging hatch 34 in order to discharge the roasted products 24 from the rotor drum 31. The drying area 39 of the gas distribution grid 28 is characterized by holes 40 perforated in a circular pattern.

The gas distribution grid 28 has from four to twelve, e.g., 4, 5, 6, 7, 8, 9, 10, 11, or 12, rows of holes 40 of two to eight, e.g., 2, 3, 4, 5, 6, 7, or 8, millimeters in diameter with a distance between centers of holes 40 ranging from two to twenty, e.g., 2, 3, 4, 5, 6, 7, 8, 9, 10, 11, 12, 13, 14, 15, 16, 17, 18, 19 or 20, millimeters and with a distance between rows ranging from five to twenty, e.g., 5, 6, 7, 8, 9, 10, 11, 12, 13, 14, 15, 16, 17, 18, 19 or 20, millimeters, and the inner and outer rows are located at a distance ranging from one to fifteen, e.g., 1, 2 3, 4, 5, 6, 7, 8, 9, 10, 11, 12, 13, 14, or 15, millimeters from the inner edge 41 and the outer edges 42 of the gas distribution grid 28, respectively.

Figure 3:
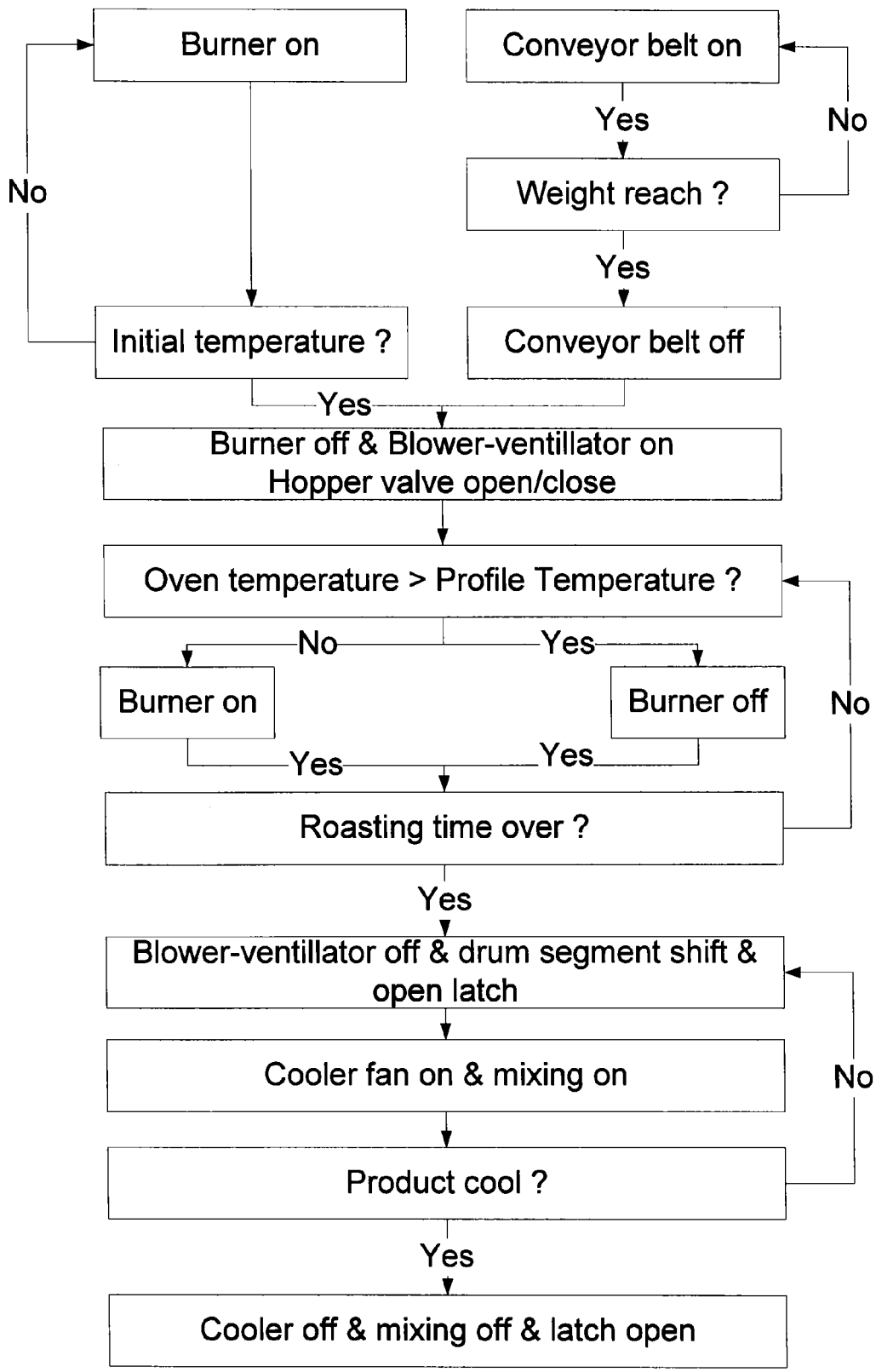
FIG. 3 is a diagram of the process by which loose products are fed to the oven, roasted and cooled, according to certain aspects of the disclosure.

FIG. 3 is a diagram of an embodiment for the roasting and cooling procedures with components described in FIGS. 1 and 2. First, the loose products 16 are fed into the hopper 2 by a conveyor belt until the weight of the loose products 16 is equal to a pre-set value. Simultaneously, heater 36 with the burner 37 starts heating air inside the oven 1 until it reaches a initial roasting temperature. As soon as a temperature sensor inside the oven 1 registers the required temperature, the gate with incorporated strain gauges 17 of the hopper 2 opens and closes in order for a batch of loose products 16 with a predetermined weight to go to the rotor drum through the sleeve 15.

The high-pressure ventilator 30 is then turned on and fresh air from the upper section 5 mixed with hot air from the heater 36 is blown to the lower section 10 through the air duct 27. This flow of hot air leaves the lower section 10 of the rectangular housing 4 through the holes 40 of the gas distribution grid 28 generating the fluid bed 34 on which the loose products 16 sit. The loose products 16 at first are evenly distributed over the gas distribution grid 28 by the air flow and then are actively mixed in the fluid bed 34. During the roasting time that is pre-set by an operator, the temperature in the oven 1 increases and decreases according to the roasting mode or temperature profile. In such a way, the loose products 16 roast in the hot air layer generated by the fluid bed 34 under a prescribed evolution or mode. The excessive air and humidified air leaves through the top opening 18 to eliminate the excessive pressure inside the oven 1. This roasting process occurring in the roasting area is controlled manually or by a controller 33 including a microprocessor and following a pre-set program, see FIG. 4 and following paragraphs for a more detailed description of the controller 33.

When the roasting time is over according to a given mode, the high-pressure ventilator 30 is turned off and the discharge hatch of the rotor drum 31 is open. The loose products 16 then pass through the slide 35 onto the cooling tray 20 of the horizontal cooler 3, and at this time, the cooling fan 19 of the horizontal cooler 3 is switched on and the mixing blades 22 start moving. The rapid cooling due to the combination of the mixing and air purging quenches the roasted loose products 24 and prevents over-roasting of the roasted loose products in a more controllable way. After the roasted loose products 24 are sufficiently cooled, the trap 25 at the bottom of the horizontal cooler 3 opens and the roasted products 24 are poured out of the horizontal cooler 3 for further processing. After this step, both the roasting and cooling processes are completed. The provided apparatus for roasting and cooling is different from the existing systems for processing loose products 16, firstly, by the principle of its operation, and, secondly, by a complex program of setting and monitoring roasting modes, which may only be used for cyclic operation of the equipment, as each batches of loose products 16 should be roasted in a specific mode.

In another embodiment, a steam cycle can be added in the roasting process of the loose products. This steam cycle uses a nozzle 46 localized under the high-pressure ventilator 30 that sprays very fine droplets of water forming a mist. The flow of air generated by the high-pressure ventilator 30 blows the mist through the heater 36 where the mist is transformed into steam. This steam is then blown through the holes 40 of the gas distribution grid 28 and mixed with the loose products 16. The steam cycle can be controlled manually or automatically via the controller 33.

The addition of the steam cycle in the roasting process provides several advantages. For example, the steam enables to coat the loose products and prevents the natural oils containing the aromas from burning. The steam cycle enables to preserve the natural aroma of the loose products. In addition, the steam cycle provides an increase of the moisture content in the loose products, within required limits, e.g. 2-5% for coffee, and increases the weight of the finalized loose products. Such a weight increase results in a more profitable value for the finalized loose products. Finally, the steam cycle provides esthetically more attractive finalized loose products as the moisture prevents the skin of the loose products from cracking.

In the described process, the loose products 16 can be processed in a cyclical pattern, i.e. with intermittent discharges of batch of the loose products 16 from the hopper 2 into the oven 1. Such a feature enables to process successive batches of loose products 16 with successive different roasting conditions which results in different finished products.

Figure 4:
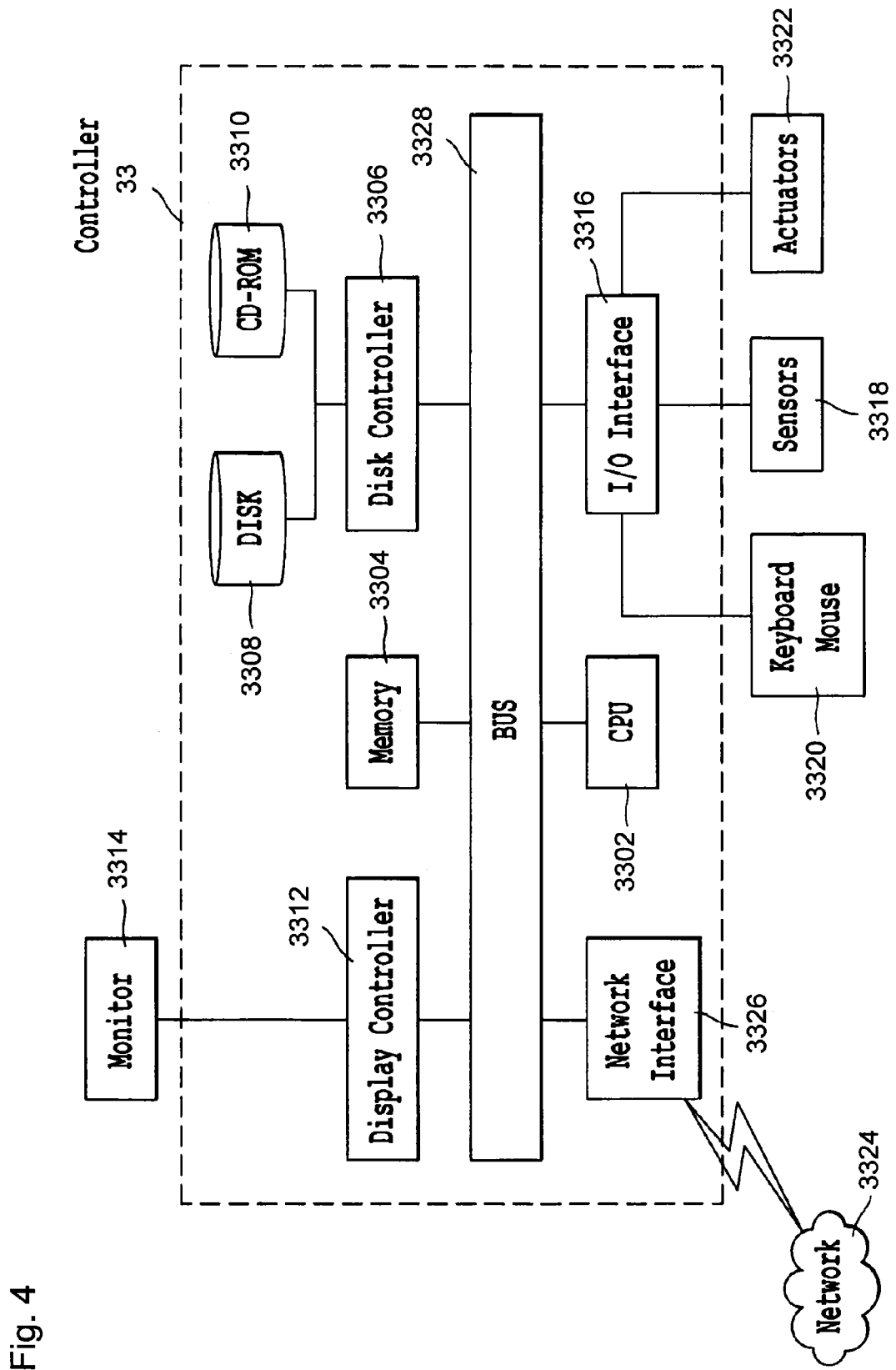
FIG. 4 is a schematic view of a hardware diagram of an illustrative controller for performing operations of a roasting and cooling apparatus for loose products.

FIG. 4 depicts the controller 33 for executing the roasting of the loose products 16. As shown in FIG. 4, systems, operations, and processes in accordance with this disclosure may be implemented using a microprocessor or its equivalent, such as a central processing unit (CPU) 3302 or at least one application specific processor (ASP). The CPU 3302 may utilize a computer readable storage medium, such as a memory 3304 (e.g., ROM, EPROM, EEPROM, flash memory, static memory, DRAM, SDRAM, and their equivalents), configured to control the CPU 3302 to perform and/or control the systems, operations, and processes of this disclosure. Other storage mediums may be controlled via a controller, such as a disk controller 3306, which may control a hard disk drive 3308 or optical disk drive 3310.

The CPU 3302 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The CPU 702 may be a separate device or a single processing mechanism. Further, this disclosure may benefit form parallel processing capabilities of a multi-cored CPU.

In another aspect, results of processing in accordance with this disclosure may be displayed via a display controller 3312 to a monitor 3314 that may be peripheral to or part of the controller 33. Moreover, the monitor 3314 may be provided with a touch-sensitive interface to a command/instruction interface. The display controller 3312 may also include at least one graphic processing unit for improved computational efficiency. Additionally, the controller 33 may include an I/O (input/output) interface 3316, provided for inputting sensor data from sensors 3318. The sensors 3318 are illustrative of any of the temperature sensors described in this disclosure.

Further, other input devices may be connected to the I/O interface 3316 as peripherals or as part of the controller 33. For example, a keyboard or a pointing device such as a mouse 3320 may control parameters of the various processes and algorithms of this disclosure, and may be connected to the I/O interface 3316 to provide additional functionality and configuration options, or to control display characteristics. Actuators 3322 which may be embodied in any of the elements of the apparatuses described in this disclosure may also be connected to the I/O interface 3316.

The above-noted hardware components may be coupled to a network 3324, such as the Internet or a local intranet, via a network interface 3326 for the transmission or reception of data, including controllable parameters. A central BUS 3328 may be provided to connect the above-noted hardware components together, and to provide at least one path for digital communication there between.

Thus, the foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modification and variations on the present invention are possible in light of the above teachings. It is therefore to be understood that within the scope of the appended claims, the invention may be practiced otherwise than as specifically described herein.

| Legend | |
|---|---|
| Description | Number |
| Oven | 1 |
| Hopper | 2 |
| Horizontal cooler r | 3 |
| Rectangular housing | 4 |
| Upper section | 5 |
| Top wall | 6 |
| Middle wall | 7 |
| Right upper wall | 8 |
| Left upper wall | 9 |
| Lower section | 10 |
| Bottom wall | 11 |
| Lower right wall | 12 |
| Lower left wall | 13 |
| Chute | 14 |
| Sleeve | 15 |
| Strain gauges | 17 |
| Top opening | 18 |
| Cooling fan | 19 |
| Cooling tray | 20 |
| Electrical motor cooler | 21 |
| Mixing blades | 22 |
| Rotor | 23 |
| Roasted loose products | 24 |
| Cooling tray trap | 25 |
| Glass doors | 26 |
| Air duct | 27 |
| Gas distribution grid | 28 |
| Screen | 29 |
| High-pressure ventilator | 30 |
| Rotor drum | 31 |
| Motor | 32 |
| Controller | 33 |
| Fluid bed | 34 |
| Slide | 35 |
| Heater | 36 |
| Burner | 37 |
| Drying area | 39 |
| Holes | 40 |
| Inner edge | 41 |
| Outer edge | 42 |
| Feeding tray | 44 |
| Discharging area | 45 |
| Nozzle | 46 |
| CPU | 3302 |
| Memory | 3304 |
| Disk controller | 3306 |
| Hard disk drive | 3308 |
| Optical disk drive | 3310 |
| Display controller | 3312 |
| Monitor | 3314 |
| I/O interface | 3316 |
| Sensors | 3318 |
| Mouse | 3320 |
| Actuators | 3322 |
| Network | 3324 |
| Network interface | 3326 |
| Central BUS | 3328 |

The invention claimed is:

1. An apparatus for roasting and cooling loose products comprising:
an oven with a housing including an upper section and a lower section, each of the upper and lower sections having a glass door;
an air duct connected to the upper section and a lower section on a first side of the housing;
a gas distribution grid connected to the upper section and the lower section on a second side of the housing;
a ventilator located on the first side of the upper section having an outlet connected to the air duct;
a rotor drum positioned on top of the gas distribution grid in the upper section on the second side of the housing;
a feeding tray positioned inside the rotor drum in the upper section of the housing;
a heater located in the lower section of the housing and configured to provide heated air;
a hopper located on top of the housing above the rotor drum and configured to feed the loose products into the oven, wherein the hopper includes a gate with one or more gauges configured to weigh the loose products being fed into the oven;
an opening located adjacent the hopper in the upper section of the housing for fresh air intake and humidified air outtake;
a horizontal cooler for cooling the loose products; and
a plurality of holes distributed in a substantially uniform and single distribution pattern throughout the gas distribution grid for providing passages for the heated air and generating a substantially uniform fluid bed on which the loose products lie and roast.

2. The apparatus for roasting and cooling loose products as claimed in claim 1, wherein the gas distribution grid is round shaped.

3. The apparatus for roasting and cooling loose products as claimed in claim 1, wherein the gas distribution grid comprises a drying area and a discharging area.

4. The apparatus for roasting and cooling loose products as claimed in claim 3, wherein the feeding tray is located above the drying area and below the hopper.

5. The apparatus for roasting and cooling loose products as claimed in claim 3, wherein the discharging area is a radial cutout equal to one section of the rotor drum and is connected to a discharge hatch.

6. The apparatus for roasting and cooling loose products as claimed in claim 5, wherein the rotor drum comprises a plurality of blades.

7. The apparatus for roasting and cooling loose products as claimed in claim 6, wherein an area between two of the blades is equal to the discharge area.

8. The apparatus for roasting and cooling loose products as claimed in claim 5, further comprising a discharge slide below the discharge hatch.

9. The apparatus for roasting and cooling loose products as claimed in claim 1, wherein the plurality of holes includes a plurality of bands of holes distant from each other and wherein each band of holes includes at least two lines of holes placed adjacently from each other.

10. The apparatus for roasting and cooling loose products as claimed in claim 9, wherein the holes are between 2 mm and 8 mm in diameter.

11. The apparatus for roasting and cooling loose products as claimed in claim 10, wherein the holes are spaced between 2 mm and 20 mm apart from each other's center.

12. The apparatus for roasting and cooling loose products as claimed in claim 9, wherein a distance between the rows is between 5 mm and 25 mm.

13. The apparatus for roasting and cooling loose products as claimed in claim 1, wherein the first and second sides of the housing are divided in the upper section by a screen.

14. The apparatus for roasting and cooling loose products as claimed in claim 1, further comprising a controller including a microprocessor that executes a process of roasting the loose products under a predetermined program.

15. A method for roasting and cooling loose products in an apparatus of claim 1, the method comprising:

storing a preset weight of the loose products in the hopper;

preheating the oven by activating the burner until the air inside the oven reaches a preset initial roasting temperature detected by a sensor inside the oven;

feeding the oven with a batch of the loose products at a predetermined weight measured by the one or more gauges of the hopper;

blowing air from the upper section mixed with hot air from the heater to the lower section through the air duct by activating the ventilator;

generating a fluid bed by letting air leave the lower section through the gas distribution grid on which the loose products sit;

roasting the loose products by increasing or decreasing the temperature inside the oven in order to follow a preset profile of temperature until a preset roasting time is reached;

evacuating excessive air and humidified air through the opening;

stopping the roasting by turning off the ventilator;

discharging the loose products onto a cooling tray of the horizontal cooler;

cooling the loose products by activating a rotor fan in the horizontal cooler until the loose products reach a preset temperature;

extracting the loose products by opening a trap at the bottom of the cooling tray.

16. The method of claim 15, wherein the cooling the loose products further comprises mixing the loose products through at least one mixing blade affixed radially and perpendicularly to the rotor fan of the horizontal cooler.

17. The method of claim 15, wherein roasting the method is executed manually or automatically under a predetermined program via a controller including a microprocessor.

18. The method of claim 15, wherein the gas distribution grid is round shaped and comprises a drying area and a discharging area.

19. The method of claim 18, wherein the discharging area is a radial cutout equal to one section of the rotor drum and is connected to a discharge hatch and the drying area comprises a plurality of holes wherein the holes are between 2 mm and 8 mm in diameter and a distance between rows of holes is between 5 mm and 25 mm.

20. The method of claim 15, further comprising accessing a whole inside of the oven through a glass door covering entirely one side of the upper section and another glass door covering entirely one side of the lower section.

21. The apparatus of claim 1, further comprising a nozzle for spraying water through the heater and providing steam for the loose products.

22. The apparatus of claim 1, wherein the horizontal cooler further comprises a cooling, tray for receiving the loose product, and a cooling fan mounted horizontally above the horizontal cooling tray for blowing air on the loose products.

23. The apparatus of claim 22, wherein the horizontal cooler further comprises a plurality of blades that extends between the cooler fan and the loose products for mixing the loose products.

* * * * *